FIG. I

INVENTORS
THEODORE O. WENTWORTH
LAWRENCE W. NISBET JR.

ATTORNEYS

Oct. 7, 1969　　T. O. WENTWORTH ET AL　　3,471,558
METHOD FOR THE DECOMPOSITION AND EVAPORATION OF UREA
SYNTHESIS EFFLUENT
Filed Feb. 27, 1964　　2 Sheets-Sheet 2

FIG. 2

INVENTORS
THEODORE O. WENTWORTH
LAWRENCE W. NISBET JR.
BY McLean and Boustead

ATTORNEYS 3,471,558
METHOD FOR THE DECOMPOSITION AND
EVAPORATION OF UREA SYNTHESIS
EFFLUENT
Theodore O. Wentworth, Cincinnati, and Lawrence W.
Nisbet, Jr., Loveland, Ohio, assignors, by mesne assignments, to Allied Chemical Corporation, New York,
N.Y., a corporation of New York
Filed Feb. 27, 1964, Ser. No. 347,763
Int. Cl. C07c *127/04*
U.S. Cl. 260—555                     2 Claims

ABSTRACT OF THE DISCLOSURE

A two-stage method for the decomposition of liquid ammonium carbamate in urea synthesis effluent with minimum biuret formation is shown. The decomposition takes place in a relatively high pressure ammonium carbamate decomposer first stage under defined conditions of temperature, pressure and residence time and in an essentially atmospheric pressure evaporator decomposer second stage under defined conditions of temperature and residence time, excess ammonia being present in both decomposition stages.

---

Figure 1:
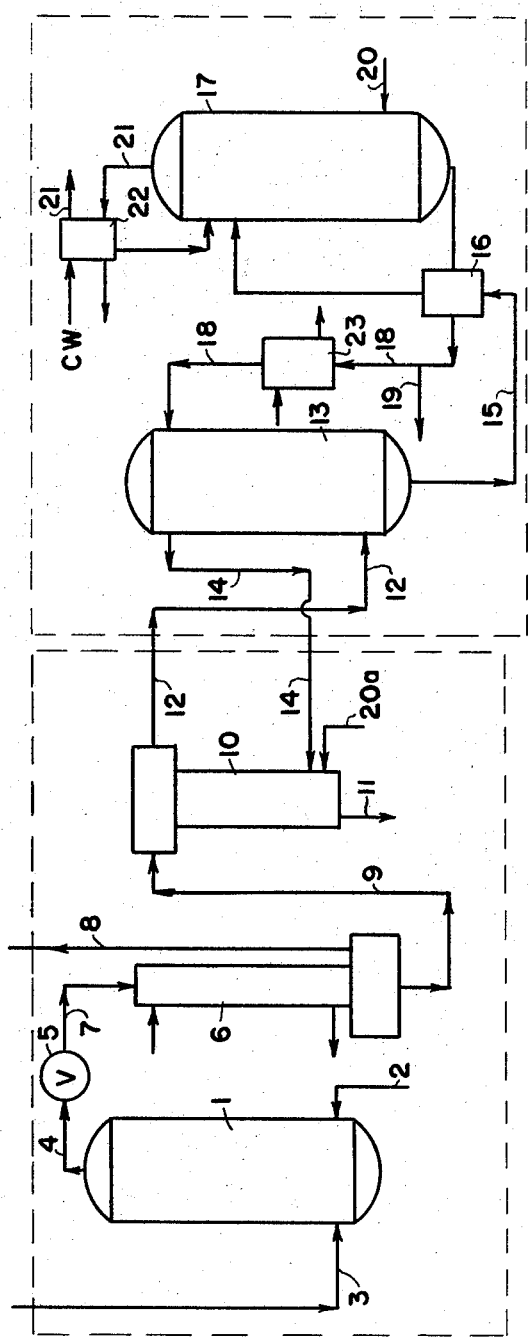

This invention relates to a method of preparing urea containing small amounts of biuret.

In all of the commercial urea synthesis processes, for example, those described in the article by W. H. Tonn, Jr., in "Chemical Engineering," October 1955, pages 186–190, carbon dioxide and ammonia are reacted in an autoclave at elevated conditions of temperature and pressure, yielding a product stream containing urea, ammonium carbamate, carbon dioxide, ammonia and water according to the following equations:

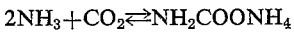

$$2NH_3 + CO_2 \rightleftharpoons NH_2COONH_4$$

$$NH_2COONH_4 \rightleftharpoons NH_2CONH_2 + H_2O$$

The ammonia and carbon dioxide are reacted at temperatures of the order of 160° to 250° C., pressures of 2,500 to 10,000 psig. and molar ratios of two to one respectively up to 200% excess ammonia and under these conditions the conversion of carbamate to urea generally is in the range of about 40 to 90 percent per pass depending on the temperature, pressure and excess ammonia employed. The unconverted ammonium carbamate in the product stream has no significant value itself but the recovery of the ammonia values contained therein is essential to make the operation economically feasible. For this reason, and to obtain a pure urea product, in all of the commercial urea synthesis processes, the product stream leaving the urea synthesis autoclave and containing urea, ammonium carbamate, carbon dioxide, ammonia and water is passed to a carbamate decomposer wherein it is heated at pressures lower than those in the synthesis autoclave to effect dissociation of the ammonium carbamate to carbon dioxide and ammonia. In or in association with the carbamate decomposer the product stream is then conventionally separated into a gaseous phase and a liquid phase and the liquid phase comprising crude urea containing on the order of twenty percent water is passed to an evaporator wherein the water is evaporated by indirect heat exchange to provide a urea-water mixture containing on the order of 0.5 percent water and .75 to 1.5 percent biuret.

Urea undergoes a number of decomposition reactions at temperatures above its melting point of about 132° C. and one of these reactions leads to the formation of biuret which cannot economically be separated from the urea and which strongly detracts from the commercial value of the urea. Although attempts to limit biuret formation have been focused primarily in the area of carbamate decomposition and evaporation, by and large, prior systems for accomplishing decomposition of carbamate have been lacking either in that the results obtained were poor or the procedures devised for effecting the decomposition were expensive, in many instances due to the large equipment requirements. The systems described in U.S. Patents Nos. 2,744,133; 2,913,493 and 3,-053,891 are typical. Frequently, the art has suggested the use of two distinct decomposition vessels, usually operated at different pressures, each being followed by a gas-liquid separating stage. Prior procedures have also employed simple distillation of the gaseous components from the liquid phase. In these procedures, however, in order to get adequate decomposition and separation, extended heating periods are required and lead to the undue formation of biuret. It is the purpose of this invention, therefore, to provide a method of preparing a concentrated urea melt containing small amounts of biuret characterized by effecting a portion of the ammonium carbamate decomposition in the crude urea evaporator thereby permitting the use of lower temperatures in the carbamate decomposer and permitting a decrease in the period of time the crude urea product leaving the synthesis autoclave is maintained under high temperature conditions until it is evaporated to a concentrated urea melt.

According to the urea synthesis process of this invention, wherein ammonia and carbon dioxide are introduced into a urea synthesis zone maintained at elevated conditions of temperature and pressure to provide a conversion of carbamate to urea of from about 40 to 90 percent to provide a product stream containing urea, ammonium carbamate, and water, the product stream is passed to a primary ammonium carbamate decomposer maintained under a pressure of from atmospheric to about 320 p.s.i.g., preferably 85 to 300 p.s.i.g., and a temperature of about 220° to 320° F. wherein about 75% to 95% by weight of the ammonium carbamate is decomposed to ammonia and carbon dioxide. The product stream in the primary decomposer is separated into a gas phase and a liquid phase and the liquid phase product stream is then passed to an evaporator decomposer maintained at such conditions that the remainder of the ammonium carbamate is decomposed to ammonia and carbon dioxide. The water in the liquid phase product stream is evaporated in the evaporator decomposer to provide a urea concentration of 95 to 99.95 percent by weight, a gas stream comprising ammonia, carbon dioxide and water vapor is withdrawn from the evaporator decomposer, and urea melt containing less than about 0.7% biuret is withdrawn from the evaporator decomposer.

Advantageously the gas stream withdrawn from the evaporator decomposer is passed to a scrubbing stage wherein it is contacted with water and the water issuing therefrom containing dissolved ammonia and carbon dioxide is passed to a stripping stage wherein it is heated for recovery of the dissolved ammonia values therefrom. Also advantageously the liquid phase product stream from the primary decomposer is contacted in the evaporator decomposer with a countercurrently flowing stream of an inert sweep gas, the gas stream withdrawn from the evaporator decomposer and passed to the scrubbing stage contains the inert sweep gas, and the inert sweep gas is separately withdrawn from the scrubbing stage and returned to the evaporator decomposer. The inert sweep gas can be those conventionally employed such as air, flue gas, carbon dioxide, ammonia or nitrogen. Advantageously the inert sweep gas is introduced into the evaporator decomposer above the melt exit point and high temperature steam is introduced into the evaporator decomposer below the point of sweep gas introduction to strip any residual ammonia from the urea melt, especially where ammonia is employed as the sweep gas.

The operating conditions employed in each of the process steps of this invention can vary considerably with upper and lower limits dictated by practical considerations obvious to those skilled in the art. Thus, for example, the urea synthesis autoclave can be operated at temperatures of about 160° to 250° C., pressures of about 2500 to 10,000 p.s.i.g., and molar ratios of ammonia to carbon dioxide of two to one up to 200% excess ammonia to give conversions of ammonium carbamate to urea of 50 to 90 percent per pass, i.e. to give a liquid melt containing about 10–60% carbamate and 40 to 90% urea based on the combined urea carbamate content. The primary decomposer can be operated at temperatures of about 200° to 320° F., preferably to give a melt exit temperature of about 230° to 270° F., and pressures from atmospheric to 320 p.s.i.g., preferably 85 to 300 p.s.i.g. The velocity of the liquid melt passing through the primary decomposer should be high and the residence time low, the latter being in the range of about 0.1 to 5 seconds. Also the increase in biuret content of the melt in the primary decomposer should be limited to about 0.25%. The evaporator decomposer can be operated at temperatures of 150° to 350° F. at subatmospheric to slightly superatmospheric pressures. Also the residence time of the liquid melt should be low in the evaporator decomposer generally being in the range of about 0.1 to 5 seconds, and the increase in biuret content should be limited to about 0.35%.

In the scrubber stage, the water washing is carried out with an amount of water and at a temperature wherein substantially all of the ammonia in the off-gas stream from the evaporator decomposer is dissolved, the temperature generally ranging from about 32° to 200° F. The wash water can be the effluent from the stripping stage after appropriate cooling. The wash water containing the dissolved ammonia is then pumped into a stripping stage wherein it is heated, as by the introduction of steam therein, to a temperature sufficiently high to remove substantially all of the ammonia from the wash water. The temperature in the stripping stage is generally within the range from about 215° to 425° F. and the pressure can range from 1 to 20 atmospheres or higher.

The primary decomposition of the ammonium carbamate in the primary decomposer can be carried out in the conventional manner employing conventional equipment such as is disclosed in U.S. Patents Nos. 2,267,133; 2,701,262; 2,744,133; 2,913,493; and 3,053,891. Advantageously, however, it is carried out by the method and in the apparatus shown and described in copending application Ser. No. 345,457, filed Feb. 17, 1964, of Theodore O. Wentworth.

That application discloses and claims a method for decomposing ammonium carbamate and separating vaporous ammonia and carbon dioxide from an essentially liquid mixture consisting essentially of urea, carbamate, ammonia and water by passing the liquid mixture through a first heated decomposition zone whereby carbamate in the liquid mixture decomposes to form gaseous ammonia and carbon dioxide, the liquid mixture and formed vapors passing as a mixed phase through the first heated zone concurrently and into a vapor separation zone. The liquid mixture passes from the first heated zone through the vapor separation zone into a second heated decomposition zone to decompose a further amount of carbamate and form ammonia and carbon dioxide vapors, the flow of the liquid mixture through the second decomposition zone being as a relatively thin film with adjacent space being provided for separation of formed vapors of ammonia and carbon dioxide and flow of the separated vapors to the intermediate separation zone countercurrent to the flow of the fluid mixture through the second heated zone. A gas stream composed of ammonia, carbon dioxide and water vapor is removed from the intermediate separation zone and liquid melt is removed from the second heated zone. As integrated with the process of this invention, the carbamate content of the liquid melt leaving the second heated zone of the process of Ser. No. 345,457 is from 5 to 25 percent by weight based on the combined urea-carbamate content.

The secondary decomposition of the ammonium carbamate in the evaporator decomposer can be carried out in the conventional manner employing conventional equipment such as is disclosed in U.S. Patents 3,267,133 and 3,110,646 and in British Patents 902,713 and 926,781. Advantageously, the evaporator decomposer is of the type disclosed and claimed in U.S. Patent 3,110,646. That patent discloses a method of evaporating a urea melt wherein the melt is repeatedly centrifugally projected from a coaxial source of supply in successively lower planes against successively lower levels of a closed surface generally transverse to the planes of projection while supplying heat by indirect heat-exchange to the liquid while it is in contact with the closed surface. The liquid is collected and the rotary motion thereof is arrested at each level after it has been projected against the closed surface, the liquid then being fed to the next lower level of centrifugal projection of the liquid. This method of evaporating a urea melt, with or without use of a countercurrently flowing inert sweep gas, provides for more efficient heat transfer to the urea melt while minimizing the residence time of the urea melt in the evaporator.

The urea melt from the evaporator containing 0.5 to 5% water can be conventionally processed or, depending upon its water content, it can be further evaporated to provide a more completely dehydrated urea of low tendency to pick up water and of low biuret content. This dehydrated urea can be flaked, pelletized, prilled or granulated in the conventional manner.

The primary decomposer can be operated at essentially atmospheric pressure as can the evaporator decomposer and when such is the case the off-gas streams can be combined and passed to a conventional neutralizer for contact with sulfuric acid or nitric acid to produce respectively ammonium sulfate or ammonium nitrate, useful as fertilizers. Preferably, however, the water content of the off-gas stream from the evaporator decomposer is first reduced by passing it through the scrubbing and stripping stages.

Alternatively, the off-gas streams can be combined, preferably after removal of water from the evaporator decomposer effluent, and passed to an ammonia-carbon dioxide separation and recovery system such as that described in U.S. Patent 2,785,045.

Advantageously, however, the primary decomposer is operated under pressures of 85 to 300 p.s.i.g. so that the off-gas stream withdrawn therefrom can be passed to an ammonia-carbon dioxide separation and recovery system operating under pressure wherein the separated and recovered ammonia is also under pressure and can be liquefied with cooling water at ambient temperatures for recycle to the urea synthesis autoclave. One such system is described in copending application Ser. No. 109,567, filed May 21, 1961 of Theodore O. Wentworth et al. (now abandoned). That application describes a urea synthesis process wherein the off-gas stream from the carbamate decomposer containing ammonia, carbon dioxide and water vapor is contacted with a liquid alkylolamine in a first contact stage whereby all of the carbon dioxide and a portion of the ammonia are absorbed by the alkylolamine, the unabsorbed ammonia being removed from the contact stage. The alkylolamine enriched with carbon dioxide and ammonia is passed to a second stage where it is heated to liberate the absorbed carbon dioxide and ammonia. The liberated carbon dioxide and ammonia are removed to a third stage where they are contacted with water, the water dissolving the ammonia and some carbon dioxide. The undissolved carbon dioxide is removed and the water containing the dissolved ammonia and carbon dioxide is passed to a fourth stage, maintained at a pressure greater than that of the first stage, wherein it is heated to produce a gaseous stream containing ammonia and a small amount of carbon dioxide. This latter gaseous stream is then returned to the first stage and the water, now substantially free of dissolved ammonia, is withdrawn from the fourth stage. Thus in a modification of the process of Ser. No. 109,567, the off-gas stream from the primary decomposer under pressure can be introduced into the first contact stage and the off-gas stream from the evaporator decomposer at essentially atmospheric pressure can be introduced into the third stage together with the liberated ammonia and carbon dioxide from the second stage. In such a modification, the inert sweep gas introduced into the evaporator decomposer, can advantageously be carbon dioxide withdrawn from the third stage.

In the above described processes wherein the ammonia and carbon dioxide content of the off-gas streams from the primary decomposer and the evaporator decomposer are separated and recovered using an alkylolamine absorbent, then the inert sweep gas should not be air since oxygen promotes degradation of alkylolamines.

Most advantageously the process of this invention is integrated with the ammonia-carbon dioxide separation process described in United States Letters Patent No. 3,107,149, issued Oct. 15, 1963 to Theodore O. Wentworth et al. That patent describes a process for the separation of ammonia and carbon dioxide from high pressure and low pressure off-gas streams by absorption of the ammonia in an alkylolamine in two absorber stages, the first absorber stage operating at a pressure within the range from about 70 p.s.i.a. to about 280 p.s.i.a. with introduction of liquid ammonia therein, and the second absorber stage operating at a pressure within the range from about 15 to about 50 p.s.i.a. Thus the high pressure off-gas stream from the primary decomposer of this invention is introduced into the first absorber stage of the process of the patent and the low pressure off-gas stream from evaporator decomposer of this invention is pressured in the stripper stage and also introduced into the first absorber.

The process of this invention is illustrated in detail by the following example taken in connection with FIGURES 1 and 2 of the accompanying drawing, FIGURE 2 illustrating the integration of the process of this invention with the ammonia separation and recovery process of Patent 3,107,149.

Referring to FIGURE 1 of the accompanying drawing, high purity carbon dioxide is introduced into reactor 1 by means of line 2 and liquid ammonia in substantial excess over the stoichiometric quantity is pumped in through line 3. The reactor operates under about 200 atmospheres pressure at about 170°–190° C. The conversion to urea based upon carbon dioxide introduced to the reactor is about 77 percent per pass. The product stream flows from reactor 1 by way of line 4 through pressure let-down valve 5 which reduces the pressure to about 20 atmospheres and then into the steam-heated primary decomposer 6. The urea synthesis melt leaving synthesis reactor 1 by way of line 4 is at a pressure of 6500 p.s.i.g. and 428° F. and is composed of 8333 lbs. per hour of urea, 2500 lbs. per hour of water, 2705 lbs. per hours of ammonium carbamate, 5892 lbs. per hour of ammonia and contains 0.15% biuret. Primary decomposer 6 is of the type described in copending application Ser. No. 345,457 and contains a first heated zone, an intermediate separation zone and a second heated zone, the gases exiting from the intermediate separation zone by way of line 8 and the urea melt exiting from the second heated zone by way of line 9. The synthesis melt entering primary decomposer 6 by way of line 7 is at a temperature of 220° F. and a pressure of 240 p.s.i.g. The off-gas stream leaving primary decomposer 6 by way of line 8 is composed of 6835 lbs. per hour of ammonia, 1221 lbs. per hour of carbon dioxide and 415 lbs. per hour of water vapor and is at a pressure of 240 p.s.i.g. and a temperature of 250° F. The liquid stream leaving primary decomposer 6 by way of line 9 is at a temperature of 250° F. and a pressure of 240 p.s.i.g. and contains 8333 lbs. per hour of urea, 2025 lbs. per hour of water, 541 lbs. per hour of ammonium carbamate and its biuret content is 0.25 percent by weight. The residence time of the liquid melt in primary decomposer 6 is about 15 seconds. Thus in primary decomposer 6, under the reduced pressure and added heat, about 80% of the carbamate dissociates into carbon dioxide and ammonia.

The liquid stream leaving primary decomposer 6 by way of line 9 is passed to evaporator decomposer 10 which is of the type described in U.S. Patent 3,110,646. Also entering evaporator decomposer 10 by way of line 14 is a sweep-gas stream composed of 6250 lbs. per hour of nitrogen and by way of line 20a is introduced 500 lbs. per hour of low pressure steam superheated to 275° F. or higher. Leaving evaporator decomposer 10 by way of line 11 is a urea melt at 275° F. of 99.8% urea concentration with respect to water and containing 0.4% biuret. This urea melt is passed to a prilling tower not shown. Leaving evaporator decomposer 10 by way of line 12 and passed to scrubber 13 is a gas stream composed of 6250 lbs. per hour of nitrogen, 236 lbs. per hour of ammonia, 305 lbs. per hour of carbon dioxide and 2581 lbs. per hour of water vapor at a temperature of 250° F. and a pressure of approximately 0 p.s.i.g. At the top of scrubber 13, maintained at a pressure of 0 p.s.i.g., there is introduced by means of line 18 a stream of 42,000 lbs. per hour of water at a temperature of 100° F. thereby effecting a countercurrent flow of water and gases resulting in the absorption of ammonia and carbon dioxide by the water. The unabsorbed nitrogen is removed from the top of scubber 13 by means of line 14 at a temperature of 110° F. and a pressure of 0 p.s.i.g. and returned to evaporator decomposer 10. Removed from the bottom of scrubber 13 by way of line 15 is a liquid stream containing 44,581 lbs. per hour of water, 236 lbs. per hour of ammonia and 305 lbs. per hour of carbon dioxide at a temperature of 150° F. and a pressure of approximately 0 p.s.i.g. The liquid stream of line 15 is then pumped through exchanger 16, wherein its temperature is raised to 200° F., and into the top of stripper 17 wherein it is contacted countercurrently with 1500 lbs. per hour of steam at 250 p.s.i.g. introduced through line 20 and wherein separation of ammonia and carbon dioxide from the water is effected. From the top of stripper 17 is removed by means of line 21 a stream of 236 lbs. per hour of ammonia and 305 lbs. per hour of carbon dioxide saturated with water vapor which after passing through exchanger 22 is at a temperature of 160° F. and a pressure of 240 p.s.i.g. or greater.

A stream of 46,074 lbs. per hour of water at a temperature of 402° F. is removed from the bottom of stripper 17 by means of line 18. This stream is passed through heat exchanger 16 and a portion is withdrawn from the system by line 19, i.e. approximately 4074 lbs. per hour of water. Thus 42,000 lbs. per hour of water is passed through exchanger 23 wherein the temperature of the water is reduced to 100° F. before being returned to scrubber 13.

Referring to FIGURE 2 of the drawing, which illustrates the carbon dioxide-ammonia separation and recovery system of Patent 3,107,149, the off-gas stream of line 8 leaving primary decomposer 6 is passed to the lower portion of high pressure absorber 114. Also entering the base of this absorber through line 21 is the stream from exchanger 22. Alternatively this stream may enter absorber 119. In absorber 114 the gases entering through line 8 and line 21 are contacted countercurrently with a liquid stream composed of 11,800 lbs. per hour of monoethanolamine entering by way of line 115. Also there is introduced at the top of absorber 114 by way of line 116 a stream of 2,000 lbs per hour of liquid ammonia at 95° F. and withdrawn overhead from absorber 114 by way of line 117 at a temperature of 111° F. and 238 p.s.i.a. are 7190 lbs. per hour of ammonia.

From absorber 114 a bottoms stream amounting to 2,000 lbs. per hour at a temperature of 275° F. is continuously withdrawn and passed through exchanger 118a in indirect heat exchange with cooling water whereby the temperature of the bottoms stream is lowered to 100° F. prior to return to absorber 114.

Withdrawn as bottoms from absorber 114 by way of line 118 and passed to the upper portion of low pressure absorber 119 is a stream at a temeperature of 275° F. composed of 11,800 lbs. per hour of monoethanolamine, approximately 422 lbs. per hour of water, 1881 lbs. per hour of ammonia, and 1526 lbs. per hour of carbon dioxide. Entering the upper section of absorber 119 by way of line 115a is a stream of 5900 lbs. per hour of monoethanolamine at a temperature of 100° F. and a pressure of approximately 5 p.s.i.g. Also there is introduced at the top of absorber 119 by way of line 121 a stream of 590 lbs. per hour of liquid ammonia at 20° F. and withdrawn overhead from absorber 119 by way of line 122 at a temperature of −21° F. and a pressure of 18 p.s.i.a. are 2471 lbs. per hour of ammonia.

Withdrawn as bottoms from absorber 119 by way of line 123 at a temperature of 285° F. maintained by reboiler 123a is a stream composed of 17,700 lbs. per hour of monoethanolamine, 1526 lbs. per hour of carbon dioxide, 422 lbs. per hous of water. The stream of line 123 is passed through the exchanger 124 wherein its temperature is raised to 300° F. and then it is introduced by way of line 125 into the upper portion of desorber 126. Overhead from desorber 126 are withdrawn by way of line 127 at a temperature of 100° F. and a pressure of 15 p.s.i.a. 1526 lbs. per hour of carbon dioxide and 42 lbs. per hour of water. Condenser 127a is used to condense water from the overhead stream returning a water reflux stream to desorber 126 and discarding 380 lbs. per hour of water to the sewer. Withdrawn as bottoms from desorber 126 by means of line 128 and passed to exchanger 124 is a stream at a temperature of 350° F. composed of 17,700 lbs. per hour of monoethanolamine. The temperature of the stream of line 128 is reduced by exchanger 124 to 330° F. and the stream of line 128 is then passed by way of line 129 to exchanger 130 wherein its temperature is further reduced to 100° F. and from whence it is passed by way of line 115 to absorber 114 and by line 115a to absorber 119. The carbon dioxide and water stream of line 127 can either be sent to disposal or recycled to the urea synthesis unit.

The high pressure ammonia vapor in line 117 from absorber 114 is passed to condenser 131 in indirect heat exchange with cooling water where it is liquefied. Low pressure ammonia vapor in line 122 from absorber 119 is combined with liquid ammonia from line 142 and is passed to line 144 from which an admixture of ammonia liquid and vapor passes into subcooler 143. Ammonia vapor which leaves subcooler 143 by way of line 147 combines with ammonia vapor vented from condenser 131 by way of line 133 to compressor 134. The compressed ammonia vapor is passed to condenser 131 where it is liquefied. Liquid ammonia leaves condenser 131 by way of line 136 to receiver 137. Liquid ammonia leaves receiver 137 by way of line 138 which discharges into lines 139 and 140. Line 139 discharges into line 116, which passes liquid ammonia to the top of absorber 114, and into line 148 which returns 7071 lbs. per hour of liquid ammonia to the urea-synthesis unit. Make-up ammonia is provided through line 149.

The stream of liquid ammonia passing through line 140 is discharged into lines 141 and 142. Line 141 carries the liquid ammonia through subcooler 143 and thence by way of line 121 to absorber 119. The liquid ammonia which passes by way of lines 142 and 144 into subcooler 143 flash vaporizes thus subcooling the liquid ammonia passing through the subcooler by way of line 141. Liquid level controller 145 maintains the level of liquid ammonia in subcooler 143 at a predetermined level by returning excess liquid to line 140 by way of line 146.

Most advantageously, especially where the sweep gas in evaporator decomposer 10 is ammonia or nitrogen, the system described in FIGURE 2 of the drawings is modified so that the low pressure ammonia stream leaving absorber 119 by way of line 122 is passed by way of dashed line 122a to scrubber 13. By passage of this low pressure ammonia stream through scrubber 13 and stripper 17, only one ammonia stream is recovered, that being from high pressure absorber 114 which is condensable with ordinary cooling water. Hence compressor 134 and subcooler 143 can be eliminated, the liquid ammonia from receiver 137 in line 138 being divided into three streams, one passing to the urea synthesis unit 1, the second passing to high pressure absorber 114, for example by way of line 116, and the third passing directly into the top of low pressure absorber 114 by way of lines 141 and 121.

In this modified system, the flow quantities described with reference to FIGURE 2 remain substantially the same except that lines 14 and 21 carry 2707 pounds per hour of ammonia and line 116 carries 9661 pounds per hour of ammonia, the temperature-pressure relationship in high pressure absorber 114 being slightly changed.

What is claimed is:

1. In a urea synthesis process wherein ammonia and carbon dioxide in a molar ratio of at least 2:1 up to 200% excess ammonia are introduced into a urea synthesis zone maintained at elevated conditions of temperature and pressure to provide a conversion of ammonium carbamate to urea of from about 50 to 90 percent and whereby a product stream containing urea, water vapor and ammonium carbamate is produced, the improvement which comprises passing the product stream through a primary ammonium carbamate decomposer maintained under a pressure of from 85 to about 320 p.s.i.g. and a temperature of about 220° to 320° F. in about 0.1 to 15 seconds wherein about 75 to 95 percent of the ammonium carbamate is decomposed to ammonia and carbon dioxide whereby the increase in biuret content of the melt is limited to about 0.25 percent, separating the product stream in the primary decomposer into a gas phase and a liquid phase, passing the liquid phase product stream from the primary decomposer through an evaporator decomposer maintained under a pressure from subatmospheric to slightly superatmospheric pressure and a temperature of about 150° to 350° F. such that the remainder of the carbamate is decomposed to ammonia and carbon dioxide and whereby the increase in biuret content of the melt is limited to about 0.35 percent, introducing into the evaporator decomposer countercurrently to the liquid phase product stream in the evaporator decomposer an ammonia sweep gas stream, evaporating water from the product stream in the evaporator decomposer to a urea concentration of 95 to 99.95 percent by weight, withdrawing ammonia, carbon dioxide and water vapor from the evaporator decomposer, and separately withdrawing from the evaporator decomposer the urea melt containing less than about 0.7% biuret.

2. In a urea synthesis process wherein ammonia and carbon dioxide in a molar ratio of at least 2:1 up to 200% excess ammonia are introduced into a urea synthesis zone maintained at elevated conditions of temperature and pressure to provide a conversion of ammonium carbamate to urea of from about 50 to 90 percent and whereby a product stream containing urea, water vapor and ammonium carbamate is produced, the improvement which comprises passing the product stream through a primary ammonium carbamate decomposer maintained under a pressure of from 70 p.s.i.a. to about 300 p.s.i.a. and a temperature of about 220° to 320° F. in about 0.1 to 15 seconds wherein about 75 to 95 percent of the ammonium carbamate is decomposed to ammonia and carbon dioxide whereby the increase in biuret content of the melt is limited to about 0.25 percent, separating the product stream in the primary decomposer into a gas phase and a liquid phase, passing the liquid phase product stream from the primary decomposer through an evaporator decomposer maintained under a pressure from subatmospheric to slightly superatomspheric pressure and a temperature of about 150° to 350° F. such that the remainder of the carbamate is decomposed to ammonia and carbon dioxide and whereby the increase in biuret content of the melt is limited to about 0.35 percent, introducing into the evaporator decomposer countercurrently to the liquid phase product stream in the evaporator decomposer an ammonia sweep gas stream, evaporating water from the product stream in the evaporator decomposer to a urea concentration of 95 to 99.95 percent by weight, withdrawing from the evaporator decomposer the urea melt containing less than about 0.7% biuret, separately withdrawing from the evaporator decomposer a gas stream containing ammonia, carbon dioxide and water vapor, passing the gas stream to a scrubbing stage and therein contacting it with water whereby some of the ammonia and all of the carbon dioxide are dissolved, withdrawing gaseous ammonia from the scrubbing stage and returning it to the evaporator decomposer as the ammonia sweep gas stream, withdrawing the water containing dissolved ammonia and carbon dioxide from the scrubbing stage, passing the water containing dissolved ammonia and carbon dioxide into a stripping stage and therein heating it whereby gaseous ammonia and carbon dioxide are produced, removing the gaseous ammonia and carbon dioxide from the stripping stage, and withdrawing water substantially free of dissolved ammonia from the stripping stage.

References Cited
UNITED STATES PATENTS

| | | | |
|---|---|---|---|
| 2,916,516 | 12/1959 | Michelitch | 260—555 |
| 2,744,133 | 5/1956 | Cramer | 260—555 |

LEON ZITVER, Primary Examiner

M. W. GLYNN, Assistant Examiner

U.S. Cl. X.R.

260—534, 553